US007392115B2

(12) United States Patent
Schindler

(10) Patent No.: US 7,392,115 B2
(45) Date of Patent: Jun. 24, 2008

(54) CHARACTERIZATION OF UTILITY DEMAND USING UTILITY DEMAND FOOTPRINT

(75) Inventor: Zdenek Schindler, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 40 days.

(21) Appl. No.: 11/365,184

(22) Filed: Mar. 1, 2006

(65) Prior Publication Data

US 2007/0208437 A1 Sep. 6, 2007

(51) Int. Cl.
*G05D 23/00* (2006.01)
*G06T 11/20* (2006.01)

(52) U.S. Cl. ......................... 700/291; 700/300; 345/440

(58) Field of Classification Search .................. 700/17, 700/22, 73, 74, 83, 286, 291, 295–297; 345/440–440.2; 715/965–967; 702/57–65
See application file for complete search history.

(56) References Cited

U.S. PATENT DOCUMENTS

| | | | | | |
|---|---|---|---|---|---|
| 5,061,916 | A * | 10/1991 | French et al. | 340/522 |
| 5,216,623 | A * | 6/1993 | Barrett et al. | 702/62 |
| 5,566,084 | A * | 10/1996 | Cmar | 700/276 |
| 5,678,758 | A * | 10/1997 | Takegawa et al. | 236/46 R |
| 6,366,889 | B1 * | 4/2002 | Zaloom | 705/7 |
| 6,480,803 | B1 * | 11/2002 | Pierret et al. | 702/130 |
| 7,071,723 | B2 * | 7/2006 | Krishnamoorthy et al. | 324/765 |
| 7,127,327 | B1 * | 10/2006 | O'Donnell et al. | 700/286 |
| 7,130,832 | B2 * | 10/2006 | Bannai et al. | 705/412 |
| 7,201,006 | B2 * | 4/2007 | Kates | 62/129 |
| 7,243,044 | B2 * | 7/2007 | McCalla | 702/182 |
| 2004/0117330 | A1 | 6/2004 | Ehlers et al. | |
| 2006/0089805 | A1 * | 4/2006 | Enis et al. | 702/2 |
| 2006/0167591 | A1 * | 7/2006 | McNally | 700/291 |
| 2006/0241905 | A1 * | 10/2006 | McCalla | 702/182 |

FOREIGN PATENT DOCUMENTS

| | | | |
|---|---|---|---|
| EP | 0614088 | | 9/1994 |
| EP | 1309062 | | 5/2003 |
| JP | 2003079052 | A * | 3/2003 |
| WO | WO-02084558 | A1 | 10/2002 |

OTHER PUBLICATIONS

Motegi, Naoya , "Web-based Energy Information Systems for Energy Management and Demand Response in Commercial Buildings", (Apr. 18, 2003).

Van Wick, J. J., et al., "Cluster and calender based visualization of time series data.", *Information Visualisation IEEE Symposium*, (Oct. 24, 1999).

* cited by examiner

*Primary Examiner*—Maria Von Buhr

(57) ABSTRACT

Utility demand is continuously monitored and monitoring data is aggregated and organized. The results are presented visually as a Utility Demand Footprint, referred to herein as a UDF. A UDF characterizes the utility demand in relation to selected influencing factors over a selected time period and over selected time intervals within the time period. In a preferred embodiment, the UDF is generated using a computer program and includes color mapping for simplifying analysis of the information displayed in the UDF. The footprint generation may be performed for a particular time period in which the demand essentially keeps its character (e.g., summer) or may be periodically updated (e.g., every day, every hour, etc.) to capture the latest changes.

17 Claims, 6 Drawing Sheets

CHARACTERIZATION OF UTILITY DEMAND USING UTILITY DEMAND FOOTPRINT

FIELD OF THE INVENTION

This invention relates generally to the analysis and monitoring of consumption patterns by utility consumers and, more particularly, a utility demand footprint comprising an intensity map portraying the intensity of utility consumption.

BACKGROUND OF THE INVENTION

Typically, the utility demand (demand for electricity, natural gas, heating, cooling, etc.) of buildings and building complexes like hospitals, office buildings, military bases, campuses, etc. depends on three principle factors: time of day during which the utility demand is occurring; the "type" of day (weekday, workday, holiday, etc.) on which the utility demand is occurring; and the weather conditions, primarily outdoor temperature, existing at the time at which the utility demand is occurring.

It is common for a utility company to include, in a billing statement, numerical data and/or graphical depictions of electricity and/or natural gas demand, on a monthly basis, for the previous twelve months. This allows a consumer to compare, for example, the electricity demand for January 2006 with the electricity demand for January 2005. This provides the consumer with information regarding the total electricity demand for an entire month and gives no detailed information regarding the outdoor temperature during that month, the weather conditions, and the like. Further, since the data is given on a per-month basis, daily profiles, temperature, different consumption patterns for holidays and weekends, etc. are not taken into account. It would be desirable to have a simple and transparent way of characterizing utility demand with more detail than has previously been available, in order to improve utility management capability.

SUMMARY OF THE INVENTION

In accordance with the present invention, utility demand is continuously monitored and monitored data is aggregated and organized. The results are presented visually as a Utility Demand Footprint, referred to herein as a UDF. A UDF characterizes the utility demand in relation to selected influencing factors over a selected footprint interval and over selected sampling intervals within the footprint interval. In a preferred embodiment, the UDF is generated using a computer program and includes color mapping for simplifying analysis of the information displayed in the UDF. The footprint generation may be performed for a particular past footprint interval in which the demand essentially keeps its character (e.g., summer) or may be periodically updated (e.g., every day, every hour, etc.) to capture the latest changes.

DETAILED DESCRIPTION OF THE INVENTION

Figure 1:
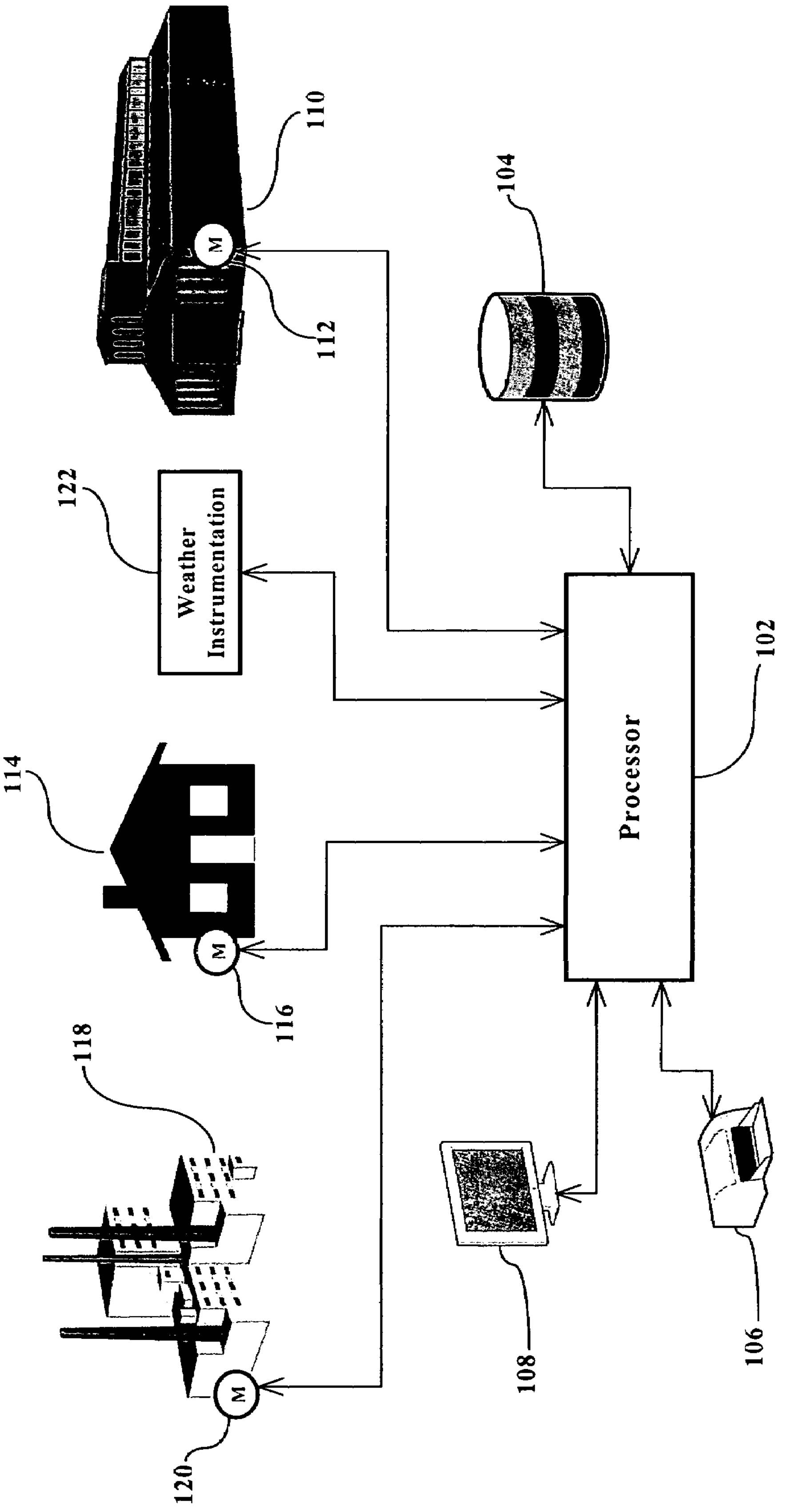
FIG. 1 is a block diagram illustrating an example of the general environment in which the present invention is utilized.

FIG. 1 is a block diagram illustrating an example of the general environment in which the present invention is utilized and the various elements utilized to achieve the present invention. Referring to FIG. 1, a processor 102 (for example, a PC, mainframe, or other known processing device) is coupled to a data storage device 104, a printer 106, and a display device 108. A first structure 110 has a metering device 112 which monitors and records the amount of a particular utility, e.g., electricity, being consumed by the operation of structure 110. A second structure 114 has a similar metering device 116 associated therewith, and a third structure 118 likewise has a similar metering device 120 associated therewith. Each of the metering devices 112, 116, and 120 are coupled to processor 102 so that any readings being taken by the metering devices are transmitted to the processor for processing and storage.

Weather instrumentation located in the vicinity of structures 110, 114, and 118 transmits weather data, e.g., outdoor temperature, wind speed and direction, and any other weather-relate data readable by known weather instrumentation, to processor 102. Although a single weather instrumentation element is shown in FIG. 1, it is understood that multiple weather instrumentation elements may be provided, e.g., each structure can have its own set of weather instrumentation located in its vicinity if desired.

The configuration illustrated in FIG. 1 allows for the gathering of utility demand data from each of the structures 110, 114, and 118, as well as for the gathering of weather-related data for the areas around the structures, for processing by processor 102 as described more fully below. In a known manner, printer 106 enables the printing of information from processor 102, and display device 108 allows for information from processor 102 to be displayed thereon. Data storage device 104 enables the storage of data from processor 102 in a known manner.

Figure 2:
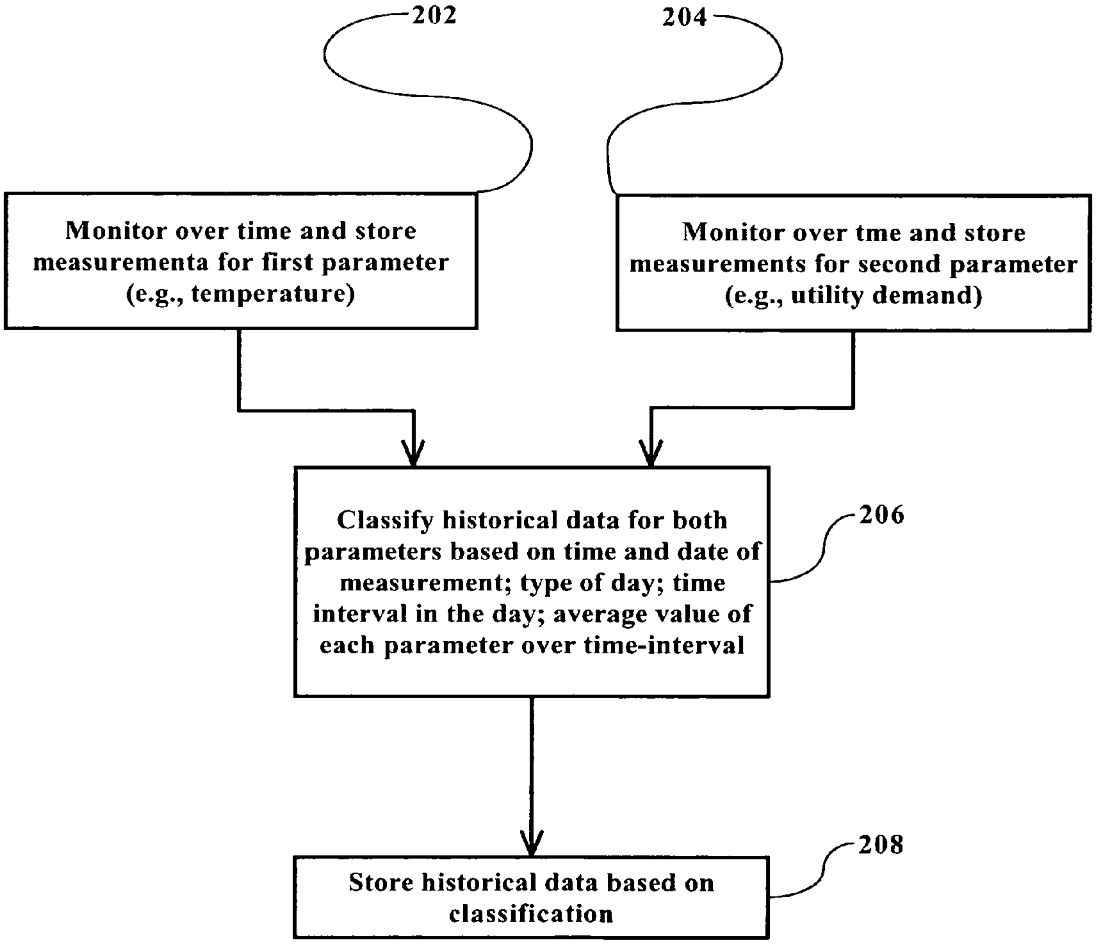
FIG. 2 is a flowchart illustrating an example of steps performed in gathering data for use in the creation of a historical database used to create a Utility Demand Footprint in accordance with the present invention.

FIG. 2 is a flowchart illustrating the gathering of data in the environment illustrated in FIG. 1, thereby enabling the creation of a historical database useable to create a UDF in accordance with the present invention. Referring to FIGS. 1 and 2, multiple monitoring actions occur simultaneously. At step 202, a first parameter, for example, outdoor temperature, is continuously monitored (or periodically over a predetermined interval) by the weather instrumentation and data stored regarding that parameter in the storage device 104 associated with processor 102. Simultaneously, at step 204, a second parameter, e.g., electricity demand in kWh, is continuously monitored (or periodically over a predetermined interval) and data is stored in storage device 104 for that second parameter. While only two parameters are shown as being monitored in FIG. 2, it is understood that other parameters, e.g., weather conditions, different types of utilities, utility demand restricted to certain zones within a structure, etc., can also be monitored and data stored for those parameters in a similar manner.

For the purpose of this invention, the term "utility demand" means an amount of energy delivered during a predetermined time period, e.g., daily, hourly, every quarter-hour, etc., related to the consumption of electricity, natural gas, fuel oil, and the like. Such activity will typically be based on the general consumption of such utilities, e.g., kWh of electricity. Existing meters can be monitored to provide this information. For natural gas, it may be desirable to calculate the total energy delivered by multiplying the amount of natural gas consumed by the calorific value of the gas.

For the purpose of this invention, there are two primary time intervals of interest. The first is referred to as the "sampling interval" and refers to the increments of time (e.g., hourly) over which data samples are repeatedly taken. The second is referred to as the "footprint interval" and refers to the overall time covered by a particular UDF (e.g., summer; November-March; etc.) As the data is gathered, the date and pertinent sampling interval (e.g., 01:00:00 AM-02:00:00 AM) of the data measurements is recorded, e.g., using date and time stamps. The date and time stamping of the recorded data can be performed by processor 102 in a well-known manner. Further, processor 102 can be configured to correlate the date-stamp of the recorded data to calendar information in a well-known manner, to allow identification of the day of the week to which the data corresponds, whether or not it is a holiday, etc. This allows, at step 206, for the gathered data to be classified based on the time and date of the measurement; the type of day (e.g., weekday, holiday, weekend); a sampling interval in the day (e.g., between 1-2 pm); and the average value of each parameter over that sampling interval. In case of utility demand in kWh, the integral value of the demand during the sampling interval may also be calculated and stored. At step 208, all of this information (the data itself and the classification information for the data) is stored in a historical database on data storage device 104.

Figure 3:
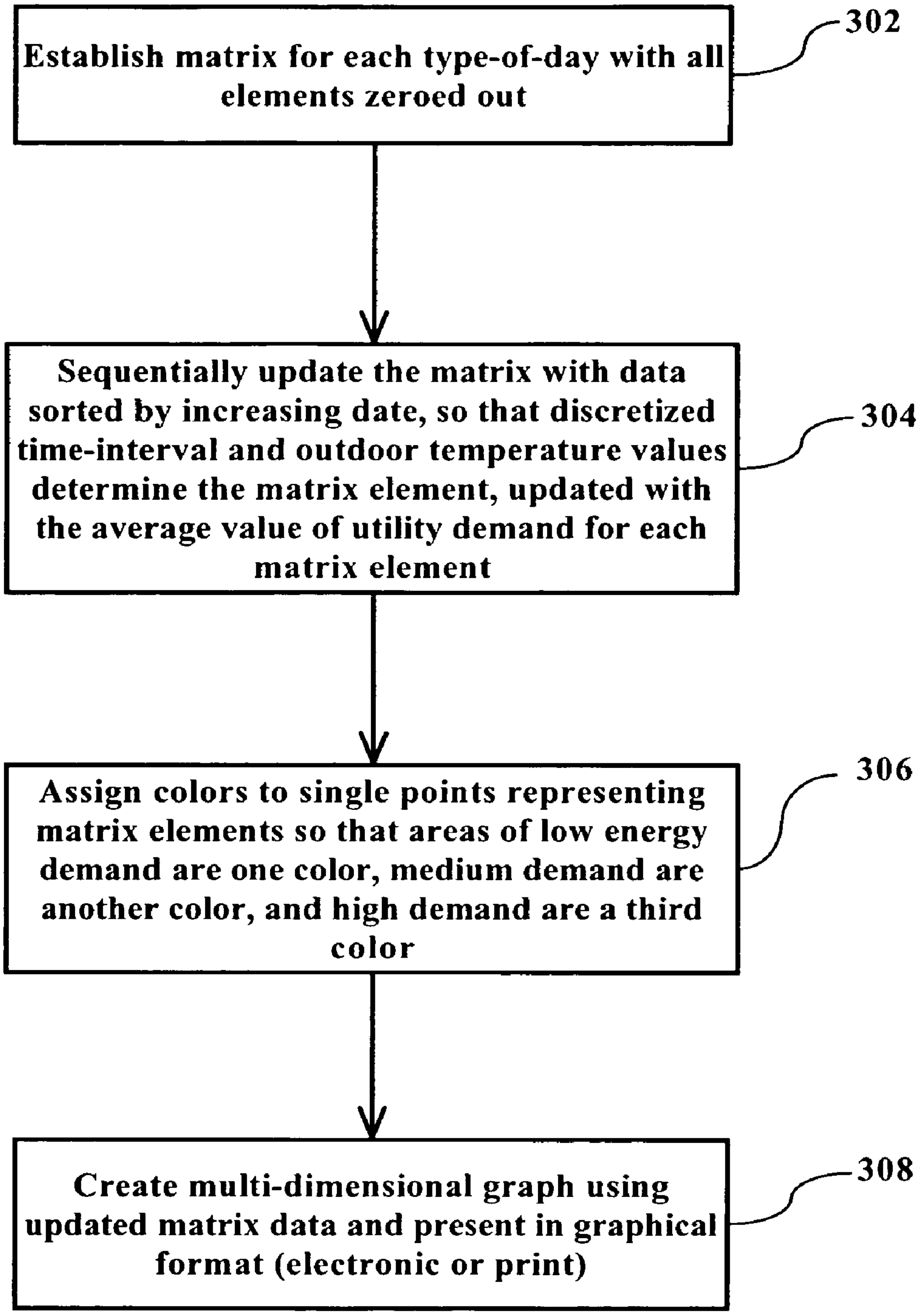
FIG. 3 is a flowchart illustrating example of steps performed in the creation of a Utility Demand Footprint in accordance with the present invention.

FIG. 3 is a flowchart illustrating the creation of a UDF in accordance with the present invention. At step 302, a matrix is established for each type-of-day with all elements zeroed out, to set normalized initial conditions for population of the matrices. A separate matrix is established for each type-of-day so that the data displayed in the UDF is representative of similar usage patterns, e.g., heavy utility use on weekdays when people are working in the structures, reduced utility demand on weekends when fewer people are working in the structure and when energy-saving measures may be active, etc. At step 304, the matrix is sequentially updated with data sorted by increasing date, so that outdoor temperature values and time-of-day (the sampling intervals) determine the matrix element, updated with the average value of utility demand for each matrix element. For updating, smoothing based on age-of-data is performed so that more recent data is weighted more heavily than older data. Alternatively, equal weights to all data may be used. Then a plain average of the past demands is obtained. The matrix then represents a two-dimensional histogram of demands. This modification may be relevant for past UDF intervals, e.g., for the summer, 2003, where there is no reason to prefer August 2003 over June 2003 data. Exponential smoothing on the other hand is preferable for current UDF interval, when we are interested in current UDF influenced by latest changes.

At step 306, colors are assigned to single points representing sampling and temperature intervals pertaining to matrix elements so that areas of low energy demand are one color, medium demand are another color, and high demand are a third color. In a preferred embodiment, the energy demand values are assigned a color that gradually changes based on the demand value, e.g., the color transitions from dark green to yellow corresponding to a transition from a low to high demand value. This allows the graph to display a gradually changing color as the demand value increases or decreases, allowing easy identification of the character of the demand and changes to the demand by simply viewing the UDF. Any colors may be used; a transition from dark green to yellow as described herein is given for the purpose of example only. Finally, at step 308, a multi-dimensional graph (the UDF) is created using the updated matrix data and is presented in graphical format (electronic or printed).

A simple way to create the UDF is to draw a rectangular mesh in a two-dimensional plane, where each matrix element corresponds to a rectangle. Each rectangle is colored in accordance with the value of the matrix element. A better footprint with smooth color transients is obtained if a surface is stretched over individual points that represent matrix elements. Each point is determined by three coordinates: x, y correspond to the matrix row and column indexes of the element; z corresponds to the value of the element. The surface may be constructed using any commonly known approximation technique, e.g., using triangular mesh, splines, etc. Then each point of the surface is colored according to its z-value.

Figure 5:
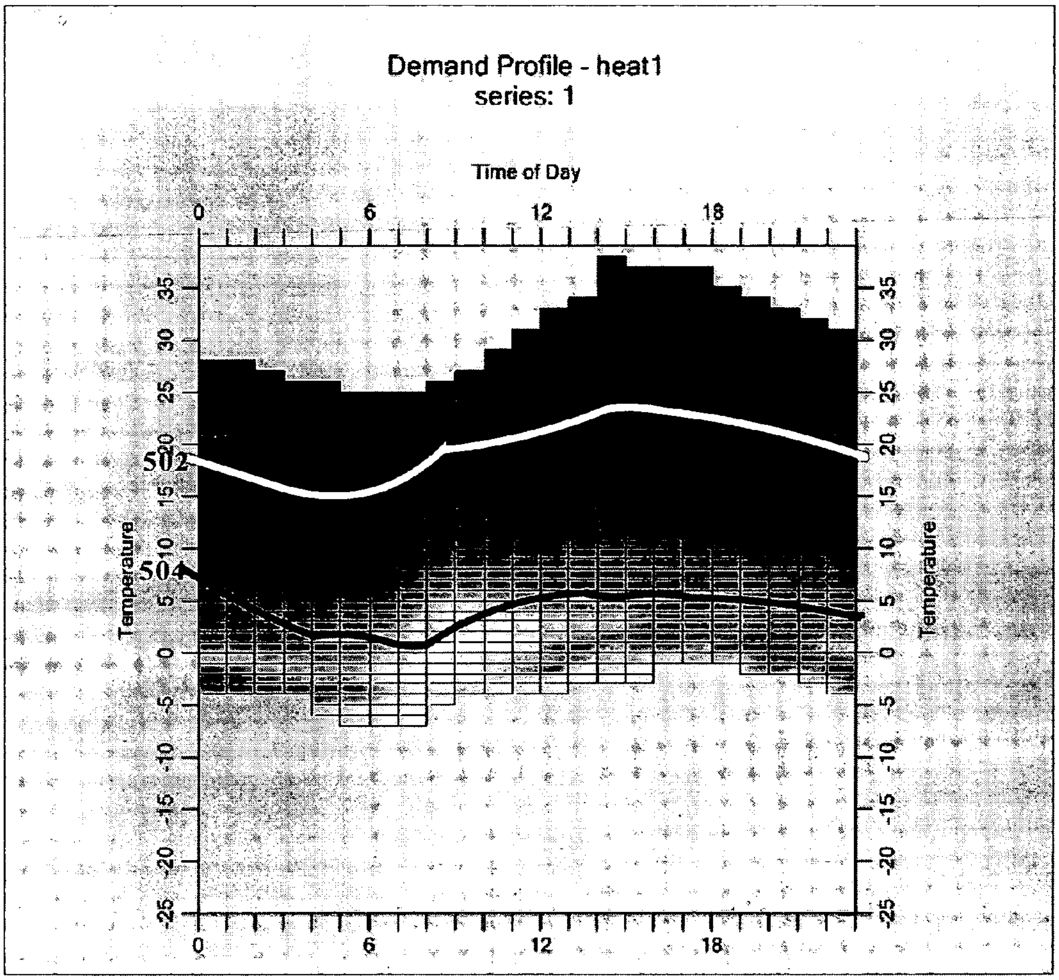
FIG. 5 is a simplified black-and-white example of another two-dimensional Utility Demand Footprint in accordance the present invention.
Figure 6:
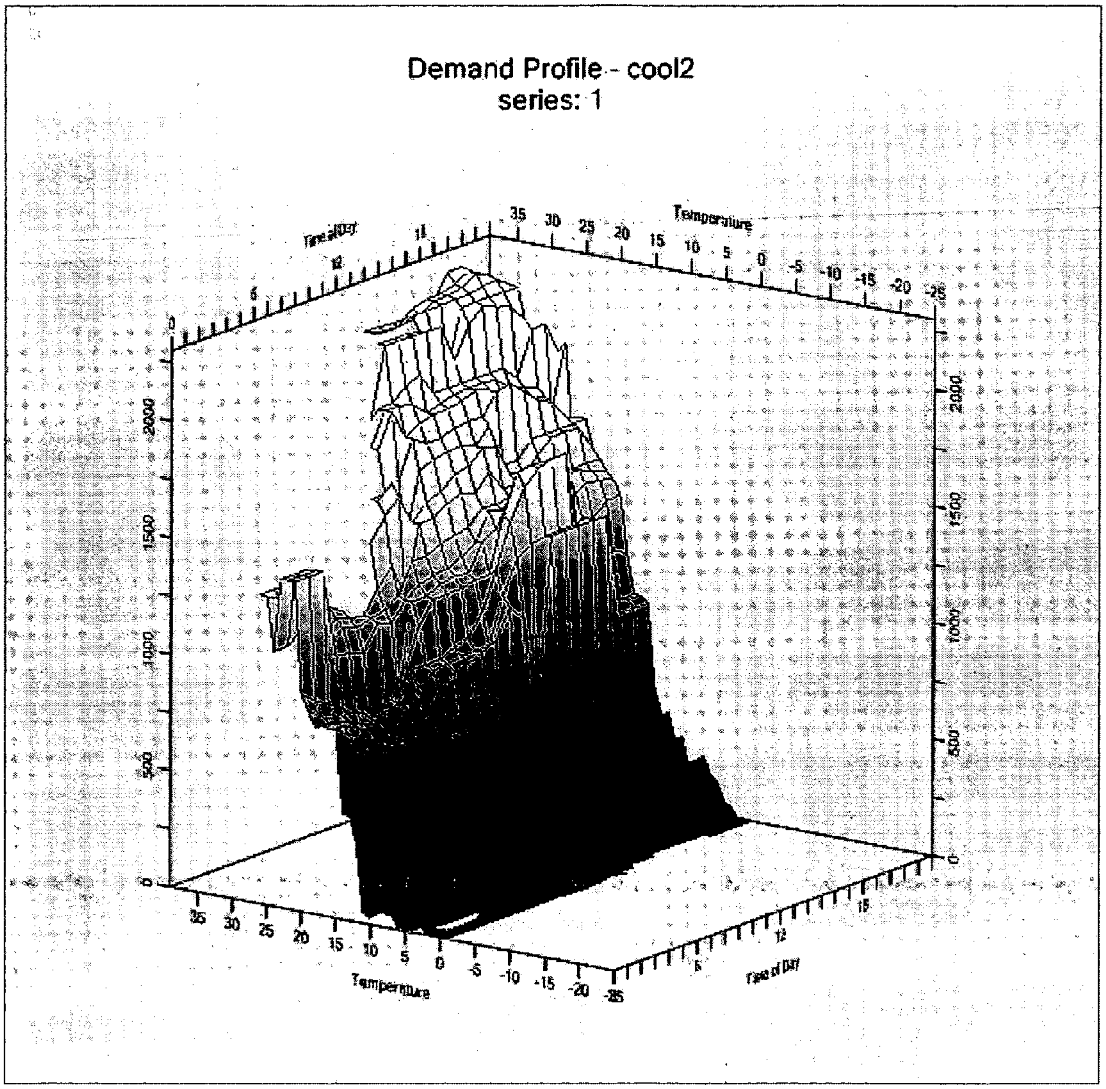
FIG. 6 is a simplified black-and-white example of a three-dimensional Utility Demand Footprint corresponding to the two-dimensional Utility Demand Footprint of FIG. 4.

The two-dimensional footprint is a projection of this colored surface on the x-y plane (see FIGS. 4 and 5), while the three-dimensional footprint is a general view on the surface from a suitable point in the space (see FIG. 6). Examples of each are described below.

Figure 4:
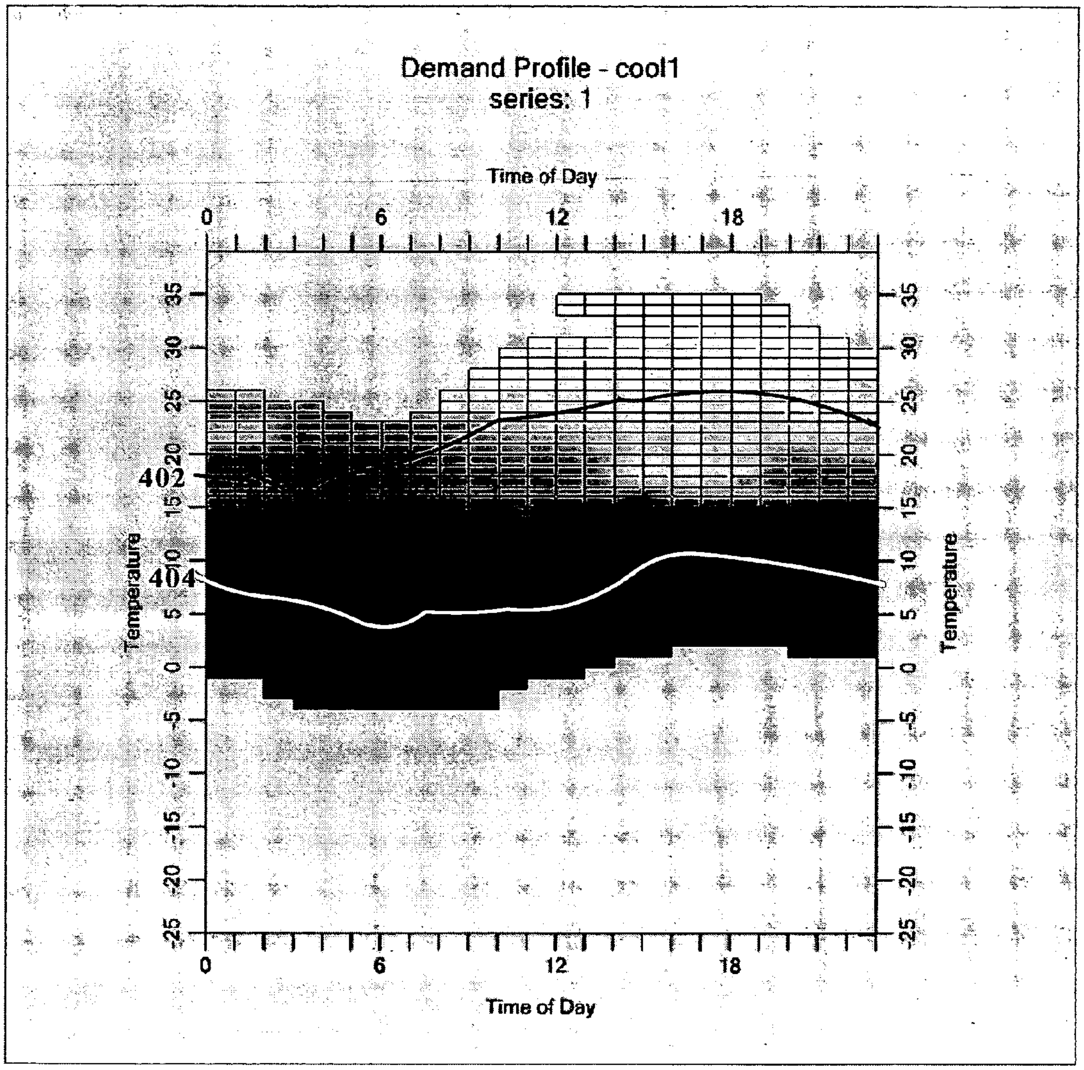
FIG. 4 is a simplified black-and-white example of a two-dimensional Utility Demand Footprint in accordance the present invention.

FIG. 4 is a simplified, black and white example of a UDF showing the demand for electricity in kWh during conditions when afternoon outdoor temperatures typically reach between 20 and 30° C. and sometime go as high as 35° C. In FIG. 4, time-intervals of high electricity demand are white or almost white, time-intervals of low electricity demand are illustrated as very dark on the UDF and the time-intervals of medium demand are illustrated in gray shading. This same shading convention is used in FIG. 5, described below.

As can be readily seen from looking at the UDF of FIG. 4, the electricity demand increases for higher outdoor temperatures and for a constant temperature does not depend significantly on the time of day. The UDF tracks the temperature and utility demand over a 24 hour period in 1 hour sampling intervals.

As noted above, the UDF classifies utility demands and shows their dependence on the principle factor(s) of interest, e.g., outdoor temperature, using color for different levels of the demand either in an absolute or in a normalized scale. Further, the typical values for the principle factors of interest, outdoor temperatures in this example, can be delimited in the UDF by, for example, including upper and lower border curves 402 and 404, respectively, to show the typical upper and lower values. Those upper and lower values may be obtained by statistical evaluation of past stored temperatures or may be derived from climatic historical data (issued by meteorologists). The UDF is built upon collected, stored, and statistically processed past and current utility demand data. The data collection is a result of periodically stored demand and weather values at the structure where the utility is being supplied.

FIG. 5 illustrates a UDF showing a typical footprint for electricity demand during a season when heating is required. As can be seen, the demand for electricity is higher for lower outdoor temperatures, and reduced heating in the evening (e.g., due to the use of programmable set-back thermostats) and intensive heating in the morning are readily apparent.

In the example described above, the historic data for each UDF are stored in the form of a five-dimensional vector consisting of the time and date of the measurement, type of the day (e.g., weekend, working day, holiday, etc.), time interval in the day (e.g., 1:00 PM-2:00 PM), total consumed energy in that time interval (e.g., 2564 kWh), average quantized value representing weather condition in that interval (e.g., 37° F.). It is understood that other measurements can be used and still fall within the scope of the present invention.

As indicated above, when creating the UDF, first a matrix is established for each type of day with all elements equal to zero. This serves to establish initial values for the computation/algorithm. Then vectors of data, sorted by increasing date, sequentially populate the matrix. The sequential number of the time-in-day interval and outdoor temperature values (e.g., the outdoor temperature value rounded to the nearest integer) determine the matrix element (central element), which is populated with the average value of the utility demand for each type of day in the desired footprint interval. For example, if the footprint interval for a UDF being created is July-September, and the type-of-day for which the UDF is being created is a weekday, and historical data exists for the period January 2000 through December 2005, then the data for all weekdays occurring from July 1 through September 30 for the years 2002-2005 can be averaged, on an hour by hour basis (e.g., all of the 9:00-10:00 AM data is averaged, all of the 10:00 AM-11:00 AM data is averaged, etc.), and the results of the averages are displayed in the UDF.

This method (averaging) treats all data, regardless of age, as essentially equal in value. It is suitable for UDFs generated for past intervals, e.g., for the purpose of monitoring changes in the utility demand. For a current UDF, from a practical standpoint, in most cases data older than one year old can be excluded, since data older than that is typically not of interest. As noted above, and described in more detail below, exponential smoothing provides more meaningful information with respect to a current UDF than does plain averaging, because it assigns exponentially decreasing weight to all data—the older the data, the less the weight. It is preferable to use exponential smoothing for a current footprint, since it shows the current character of the demand which evolves on a day-to-day basis.

In a preferred embodiment, the populating is done using an expression based on exponential smoothing in the age-of-data dimension that respects possible slow evolution of energy demand. The exponential smoothing (exponentially weighted moving average, or EWMA) model uses a weighted average of past and current values in a well-known manner, adjusting weight on current values to account for data aging. Using an exponential smoothing alpha coefficient term (between 0 and 1), one can adjust the influence of the smoothing effects. Thus, the method gives more weight to recent values than to old values, and the weight exponentially decreases with the age of the data. An example of how weighting recent values more heavily can be beneficial is a situation where energy-saving improvements have been made to a building for which a UDF is being created. More recently-gathered data will be more likely to give an accurate depiction of the current utility demand, since the more recent data will reflect the demand with the energy-saving measures in place, while data gathered before the energy-saving measures were implemented will skew the portrayal of the demand data away from what the current demand really is.

Other elements within a certain neighborhood of the relevant matrix element may be updated using another weighting constant, which is a function of the distance between updated elements and their relevant matrix element. Different metrics defining the distance of two matrix elements may be used. The radius of the neighborhood may be zero; then no other matrix element except the relevant matrix element is updated. Weighted symmetric averaging in time-of-day and temperature dimensions are used to further suppress noisy character of data. Exponential smoothing smoothes data in the time dimension. It means that it more or less eliminates random fluctuations in data.

This "neighborhood updating" may be useful because if only the central element is updated, the potential exists for the UDF to still be too "turbulent". Therefore, the influence of a single update can be "scattered" also onto other surrounding matrix elements. However, the weight of the updates to the neighboring matrix elements is lower than the weight of updating for the central element. The weight for updating neighboring matrix elements can be dependent on the distance of the neighboring element from the central element. For example, for a sampling interval of 4:00-5:00 AM, when it is 12° C., and where 4256 kWh, if electricity is consumed during that sampling interval, a corresponding central element with coordinates M[5,42]=4150 can be located and updated with the value 4256 using exponential smoothing expression for chosen alpha coefficient. This updates the value at M[5,42].

In addition, neighboring elements M[4,41], M[4,42], M[4,43], M[5,41], M[5,43], M[6,41], M[6,42], M[6,43] can also be updated. As can been seen, all elements that differ by not more than one coordinate in each direction are updated, yet with less weight. Of course, if desired the influenced neighborhood could be extended further, e.g., to +/−2 in each direction. This weight is independent of exponential smoothing weight and may be, e.g., linearly dependent on the difference of indexes of updated elements and central elements. Exponential smoothing weight is dependent on the age of data and is determined by the alpha coefficient. Data updating the matrix are weighted twice—once in dependence on their age and then in dependence on the distance from the central elements. The distance from center weight is applied explicitly. The age-of-data weight is applied implicitly by a recursive formula that is part of the exponential smoothing method. Exponential smoothing is a computationally efficient way to apply exponentially decreasing weight. The essence of this is a recursion.

The following example illustrates the operation of the present invention. In this example it is presumed that a historical database exists that stores utility demand data for electrical demand, natural gas demand, heating demand, and cooling demand. For the sake of simplicity, this example focuses on electrical demand; however, it is understood that numerous other elements of utility demand may be measured and utilized for preparation of a UDF in accordance with the present invention.

For the purpose of this example, it is assumed that electrical demand data, as measured by an electric meter, has been stored in the historical database on an hourly basis, for the period Jan. 1, 2002 through the present. In this example, the data monitoring system reads the electrical demand of a particular building each hour (e.g., from 9:00:01 AM-10:00:00 AM; from 10:00:01 AM-11:00:00 AM, etc.) and transmits to the processor the electrical demand data gathered during that one-hour period (the sampling interval) upon the expiration of the one-hour period, e.g., at 10:00:03 AM. This most recent data reading is referred to herein as the "current data vector", and it is added, by the processor, to the historical data set, which comprises all of the other data except for the most recent data reading, i.e., except for the current data vector. The current data vector extends the historical database by the new data record, which represents the electrical demand during the last sampling interval (one hour in this example).

As the current data vector is transmitted and stored with the historical data set, it is time and date stamped so that it may be sorted based upon the date, the day of the week (e.g., Monday, Saturday, etc.), and the sampling interval during which it was recorded, just like the historical data. As noted above, the processor can be configured to identify specific dates, such as holidays, where it is anticipated that the electrical demand is likely to be different, depending upon circumstances. For example, it is common for buildings to significantly reduce the heat provided in the building on weekends and holidays to save on energy costs, and since there are typically fewer people in the building on weekends and holidays, the overall demand for electricity will also be significantly reduced. Accordingly, the processor can be configured to identify particular dates and/or times as being of a particular type of day (e.g., weekend and/or holidays). This allows a footprint to be created that is focused on electricity demands only for workdays, only for weekends and/or holidays, etc.

With the data gathered, stored, and classified in this manner, a footprint is created in accordance with the present invention. To create a UDF, various parameters may be input to the processor by the user (e.g., via a keyboard or other input device) to limit the footprint to certain types of day or certain time periods, etc. The user may be as specific or generic as desired. For example, the user can simply input a footprint interval, e.g., November, 2004 through March, 2005, and a basic footprint, identifying electricity demands by each sampling interval (one hour sampling intervals in this example) can be created. The UDF will comprise a graph showing the typical electricity demand in relation to the outdoor temperature, on an hour-by-hour basis, irrespective of the type-of-day during the footprint interval.

For more resolution, the user can instead indicate that they would like to see a footprint for the same footprint interval, e.g., November, 2004 through March, 2005, but isolate the footprint to display average hourly demands only for workdays. Since the data is classified by type-of-day, this can be easily accomplished. The user may vary the footprint intervals, sampling intervals and types of day as desired to create any type of footprint, limited only by the manner in which the data has been classified in the historical database.

The footprint visualizes the matrix that is built from all data for a certain time interval, e.g., the user may make a winter footprint, a fall footprint, a summer footprint, etc. This allows the footprint to characterize the seasonal behavior of the building for the particular season, and allows different footprints to be compared to reveal different behavior of the demand in different seasons.

The footprint may be created from the historical database once and then printed and used as a chart characterizing the building utility demand in various seasons or for various day-types or time-periods. For the current season, the data is updated (hourly, in this example) and the footprint will continually evolve and reflect potentially changing actual behavior of the building over time.

As an alternative to printing out a chart for a particular UDF, the information for the current UDF (e.g., a footprint of the current season) can also be displayed graphically, for example, on a computer screen, and the system can be configured to update the displayed footprint based on the most recently gathered data. In the example above, this would mean that each hour the displayed footprint would be updated with the data from the most recent sampling interval.

Displaying the UDF on screen allows a UDF for a building to be constantly monitored to identify, in essentially real time, significant changes in utility demand which might warrant investigation. As the UDF represents "smoothed" data, random temporary changes in the demand do not directly appear in the UDF. Random fluctuations are filtered out as aberrations and thus the true character of the demand is preserved. Visibly different values of actual demand as compared with stored values of a UDF, for the same sampling interval and outdoor temperature, may raise a flag that something unusual is happening. The magnitude of the difference may distinguish between random deviations (a low-magnitude difference, i.e., a transient spike) or some more significant event (a high-magnitude difference).

In the example described above, the UDF is preferably a two-dimensional colored map showing typical past utility demands for particular weather situations during a day. The two-dimensional UDF's of FIGS. 4 and 5 will typically be sufficient to render the utility demand character. However, if desired, a three-dimensional UDF diagram can be created as shown in FIG. 6. The three-dimensional UDF portrays a colored three-dimensional surface created over the matrix structure (coloration not shown). The 3-D surface is a suitable (e.g., piece-wise linear or spline) surface generated by single points representing the matrix elements. In this example the X-coordinate of the point is the sequence number of the time-in-day interval and the Y-coordinate is the discretized outdoor temperature. The Z-coordinate is the value of the matrix element and represents utility demands, e.g., electricity demand in kWh. The color of each pixel is assigned according to a user-defined color palette as previously described. Typically the three-dimensional diagram is utilized only when the two-dimensional diagram cannot describe the demand character clearly enough.

Several footprint classes may be created: for example, seasonal footprints describe the utility demands in each season (winter, summer, transition between two seasons, etc.); type-of-day footprints characterize separately the demand in weekend days and working days.

The UDF as described herein projects typical utility demands in different time-in-day (sampling) intervals and weather conditions onto one diagram. It shows how the utility demand depends on weather, particularly temperature, if it is independent on the time of day, if the utility demand is constant, or if it evolves over time, and it allows analysis of what the behavior of this system was in extreme weather conditions.

The present invention may also be used to examine the character of slow utility demand changes. In such cases, a footprint is generated at the beginning of a relevant footprint interval and diagrams are stored periodically during footprint interval. For example, a summer footprint can begin to be generated in April and at the end of each week (starting in June) the UDF's for that week can be stored, numbered by the week number. In October all the stored charts can be recalled, ordered by their week numbers, and displayed as an animated sequence. Animation may reveal changes in demand that occurred during the monitored period. Animation of the stored diagrams, in sequence, allows a user to visualize the evolution of the utility demand over the period of interest. Pure comparison of static charts is telling, but animation can allow visualization of emerging changes in demand patterns, visible as color changes in UDF, in a much clearer and effective manner.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored in storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

I claim:

1. A method of displaying to a user a utility demand footprint visually characterizing the utility demand of a structure in relation to one or more influencing factors, the method comprising:

measuring over time a first parameter associated with at least one of said influencing factors and storing said measurements of said first parameter;

measuring over time a second parameter associated with the use of a particular utility within said structure and storing said measurements of said second parameter;

displaying a visual representation of said measurements of said first and second parameters in the form of an intensity map, said intensity map depicting the intensity of said second parameter in relation to said first parameter over a predetermined period of time.

2. The method of claim 1, wherein said first parameter comprises outdoor temperature in the vicinity of said structure and wherein said second parameter comprises electricity consumption.

3. The method of claim 1, wherein said first parameter comprises outdoor temperature in the vicinity of said structure and wherein said second parameter comprises natural gas consumption.

4. The method of claim 1, further comprising:

identifying a footprint interval comprising a set of said stored measurements for said first and second parameters;

dividing all of said stored measurements within said footprint interval into predetermined sampling intervals;

determining an average value of said stored measurements for all of the predetermined sampling intervals falling within said identified footprint interval;

for each predetermined sampling interval falling within said identified footprint interval, identifying a value of said second parameter and creating a visual representation of said identified value of said second parameter; and displaying each of said visual representations in graphical format as a utility demand footprint.

5. The method of claim 4, wherein said predetermined sampling intervals comprise one hour intervals within a 24-hour day.

6. The method of claim 5, wherein said footprint interval comprises stored measurements corresponding to any one of the seasons of spring, summer, fall, or winter as defined by the Gregorian calendar.

7. A data storage device having a data structure stored thereon for causing a computer system to display a utility demand footprint, comprising:

a cumulative visual representation of statistically processed values of energy demand occurring during a predetermined set of sampling intervals, correlated to outdoor temperature measurements taken during the same predetermined set of sampling intervals, wherein different values of energy demand are displayed in said visual representation as different colors.

8. The data storage device of claim 7, wherein said energy demand comprises electricity consumption.

9. The data storage device of claim 7, wherein said energy demand comprises natural gas consumption.

10. The data storage device of claim 7, wherein said cumulative visual representation visually characterizes said values of energy demand in a two-dimensional graph as a function of outdoor temperature and each time of day of each of said sampling intervals in said set.

11. The data storage device of claim 10, wherein said predetermined sampling intervals comprise one hour intervals within a 24-hour day.

12. The data storage device of claim 11, wherein a footprint interval comprises any one of the seasons of spring, summer, fall, or winter as defined by the Gregorian calendar wherein samples from such corresponding season are represented by the footprint.

13. A method of displaying to a user a utility demand footprint visually characterizing the utility demand of a structure in relation to one or more influencing factors, the method comprising:

measuring over time a first parameter associated with at least one of said influencing factors and storing said measurements of said first parameter;

measuring over time a second parameter associated with the use of a particular utility within said structure and storing said measurements of said second parameter;

identifying and storing a time and date of measurement of said stored measurements for said first and said second parameters;

identifying a footprint interval comprising a set of said stored measurements for said first and second parameters;

dividing all of said stored measurements within said footprint interval into predetermined sampling intervals;

determining an average value of said stored measurements for all of the predetermined sampling intervals falling within said identified footprint interval;

for each predetermined sampling interval falling within said identified footprint interval, identifying a value of said second parameter and creating a visual representation of said identified value of said second parameter; and displaying each of said visual representations in graphical format as a utility demand footprint.

14. The method of claim 13, wherein said first parameter comprises outdoor temperature in the vicinity of said structure and wherein said second parameter comprises electricity consumption.

15. The method of claim 13, wherein said first parameter comprises outdoor temperature in the vicinity of said structure and wherein said second parameter comprises natural gas consumption.

16. The method of claim 15, wherein said predetermined sampling intervals comprise one hour intervals within a 24-hour day.

17. The method of claim 16, wherein said footprint interval comprises stored measurements corresponding to any one of the seasons of spring, summer, fall, or winter as defined by the Gregorian calendar.

* * * * *